United States Patent [19]

Stanley et al.

[11] 4,039,406
[45] Aug. 2, 1977

[54] RECOVERING COPPER FROM CONCENTRATES WITH INSOLUBLE SULFATE FORMING LEACH

[75] Inventors: Robert W. Stanley, Kirkland; Kohur Nagaraja Subramanian, Mississauga, both of Canada

[73] Assignee: Noranda Mines Limited, Canada

[21] Appl. No.: 684,374

[22] Filed: May 7, 1976

Related U.S. Application Data

[63] Continuation of Ser. No. 491,870, July 25, 1974, abandoned.

[30] Foreign Application Priority Data

Aug. 10, 1973   Canada .................. 179995

[51] Int. Cl.² .............................................. C25C 1/12
[52] U.S. Cl. ................................. 204/108; 75/117; 423/36; 423/41
[58] Field of Search .............. 423/36, 41, 45, 557; 75/115, 117, 108; 204/108

[56] References Cited

U.S. PATENT DOCUMENTS

| | | | |
|---|---|---|---|
| 835,575 | 5/1907 | Boileau ................... | 75/115 |
| 1,050,630 | 1/1913 | Edison .................... | 423/36 |
| 3,293,027 | 12/1966 | Mackiw et al. ......... | 75/115 |
| 3,637,371 | 1/1972 | Mackiw et al. ......... | 423/41 |
| 3,776,826 | 12/1973 | Atadan .................... | 75/117 |
| 3,879,272 | 4/1975 | Atwood et al. .......... | 75/117 |

OTHER PUBLICATIONS

Roman et al. "The Dissolution of Copper Concentrates" *Minerals Science Engineering* vol. 5, No. 1 Jan. 1973, pp. 3–24.

Haver et al. "Recovery of Copper, Iron and Sulfur from Chalcopyrite Concentrate Using a Ferric Chloride Leach" Journal of Metals 2/71 pp. 25–29.

*Primary Examiner*—O. R. Vertiz
*Assistant Examiner*—Brian E. Hearn
*Attorney, Agent, or Firm*—Finnegan, Henderson, Farabow & Garrett

[57] ABSTRACT

This invention provides a novel and an improved hydrometallurgical method for recovering copper values from copper concentrates. The method essentially comprises the following steps:

a. forming an aqueous leach solution containing chloride or bromide ions in a predetermined concentration;

b. dispersing copper concentrates in such leach solution to form a slurry;

c. carrying out the leaching operation of the slurry at an elevated temperature and under an overpressure of oxygen so as to transform a major proportion of the copper values present in the concentrates into a solid basic copper sulphate;

d. separating the resulting leach residue containing the basic copper sulphate from the leach solution; and e. recovering the copper values from the obtained leach residue.

The process is simple and efficient and can be carried out either batchwise or continuously.

18 Claims, 4 Drawing Figures

RECOVERING COPPER FROM CONCENTRATES WITH INSOLUBLE SULFATE FORMING LEACH

This is a continuation of application Ser. No. 491,870, filed July 25, 1974, now abandoned.

This invention relates to a novel hydrometallurgical method of treating copper concentrates to recover copper values therefrom. More particularly, the invention relates to a method for recovering copper values by leaching copper concentrates in an aqueous leach solution at an elevated temperature and under oxygen overpressure.

There are already known hydrometallurgical methods for treating copper concentrates in aqueous sulphuric acid leach solutions at elevated temperatures and under oxygen pressure, whereby copper values are dissolved in the leach solution and then extracted from the solution by electrowinning or the like.

One such method is disclosed in Canadian Pat. No. 712,989 issued July 6, 1965 to Vladimir N. Mackiw et al. According to this method, the mineral sulphides are leached in a solution which contains sulphuric acid in an amount at least sufficient to combine with the copper values present in such mineral sulphides to form sulphates, and the resultant slurry is reacted under a pressure of a free oxygen bearing gas and at a temperature above 175° F.

Another method is disclosed in Canadian Pat. No. 808,108 issued Mar. 11, 1969, also to Vladimir N. Mackiw et al. According to this method, the mineral sulphides having a particle size of at least 90% minus 325 mesh are leached in an aqueous sulphuric acid solution under certain specific conditions, such that the amount of acid is sufficient to stoichiometrically combine with copper values contained in the sulphides as sulphates, and at the same time such that the acid to copper molar ratio in the resulting slurry is less than 1:1 but more than 0.55:1, the reaction being carried out at a temperature within the range of 210° F to 250° F under oxygen partial pressure of above 100 psig.

Such known methods suffer from several important drawbacks, such as the requirement for fine grind of the concentrate, a substantial circulating load of incompletely leached concentrate which must be recovered from the leach slurry by flotation, and from a rather long copper extraction step due to the need to reprecipitate any dissolved iron from the leach solution. Consequently, none of these known methods has up to now achieved widespread industrial acceptance, in spite of the fact that hydrometallurgical treatment of copper concentrates is of paramount interest, since it eliminates all polluting gases which are emitted during conventional smelting and converting operations.

It is therefore a principal object of the present invention to provide a novel and efficient hydrometallurgical method of treating copper concentrates which will avoid or substantially reduce the disadvantages and drawbacks of presently known acid leaching methods.

A further object of the present invention is to provide a hydrometallurgical method which will make it possible to achieve excellent results with the use of an aqueous leach solution containing chloride or bromide ions and wherein the copper values are extracted from the leach residue rather than from the leach solution.

A still further object of the present invention is to provide a hydrometallurgical method that can be used directly on copper concentrates in as-received condition, with no need for additional grinding.

Other objects and advantages of the invention will become apparent from the following more detailed description of the invention.

Basically, the hydrometallurgical method of recovering copper values from copper concentrates, in accordance with this invention, comprises:

a. forming an aqueous leach solution containing chloride or bromide ions in a predetermined concentration;

b. dispersing copper concentrates in said leach solution to form a slurry;

c. carrying out the leaching operation of said slurry at an elevated temperature and under oxygen overpressure and with the concentration of the chloride or bromide ions such as to transform a major proportion of the copper values present in the concentrates into a solid basic copper sulphate;

d. separating resulting leach residue containing said basic copper sulphate, from the leach solution; and e. recovering the copper values from said leach residue.

The source of the chloride or bromide ions in the aqueous leach solution may be acidic or non acidic. For example, HCl or HBr may be used to provide such ions. However, chlorides or bromides such as sodium chloride, calcium chloride, ammonium chloride, sodium bromide, potassium bromide and the like, have also been found entirely acceptable.

To form the aqueous leach solution, the chlorides or the bromides or the hydrochloric or hydrobromic acid respectively are simply dissolved in water in a predetermined concentration. The exact concentration may depend on many factors, such as the specific source of chloride or bromide ions employed, the leaching temperature and oxygen pressure utilized, the grind of the concentrate, if any, the time of the leaching operation and the like. However, in all cases the concentration should be such as to transform, under prevailing conditions of the operation, a major proportion of the copper values present in the concentrates into an insoluble basic copper sulphate, while maintaining satisfactory overall Cu conversion conditions. The expression "solid basic copper sulphate" in this context, obviously means that this basic copper sulphate is solid in the leach solution employed for the leaching operation and is not dissolved in such solution to any great extent.

To achieve these results, the mole ratio of $Cl^-/Cu$ or $Br^-/Cu$ may be as small as 0.08/1, particularly when HCl or HBr is used as the source of chloride or bromide ions. Higher ratios are also quite suitable and at one point a maximum effective concentration of $Cl^-$ or $Br^-$ is reached, beyond which very little if any additional effect is achieved if the concentration is further increased.

In addition to the source of chloride or bromide ions, there may be introduced into the leach solution a source of sulphate ions, such as sulphuric acid, sodium sulphate or the like. However, the introduction of $SO_4^{--}$ ions into the leach solution is not essential, since the reaction will proceed even if these ions are not initially added. It is believed, however, that during the leaching operation under elevated temperature and oxygen pressure conditions, $SO_4^{--}$ ions will be formed in situ and will then participate in the transformation of the copper sulphides into basic sulphate.

In the most preferred embodiment, however, the leach solution is formed with a mixture of hydrochloric and sulphuric acids. When an acidic mixture such as this is used, it is preferred that the total amount of acid in the resulting slurry be such that the molar ratio $H^+/Cu$ is between about 0.15/1 and 0.65/1, and the molar ratio of $Cl^-/Cu$ in the slurry is greater than about 0.08/1. Usually, such a mixture will contain at least 25% by weight of the hydrochloric acid.

Generally speaking, however, whether or not an acidic leach solution is initially employed, the pH of the leach slurry will usually stabilize after a certain reaction time and will remain between about 2.5 and 4.5 until the reaction is completed.

As far as leaching temperature and oxygen pressure are concerned, these will depend on many factors such as those already mentioned above. However, any combination thereof which will achieve the desired result of transforming a major portion of the copper values present in the concentrate into a solid basic copper sulphate and provide a desired high overall Cu conversion, will be found satisfactory. In particular, temperatures between about 125° C and 160° C, and especially between 140° C and 150° C have been found very suitable. Also oxygen partial pressures above 180 psig, and particularly between 200 and 300 psig have been found quite satisfactory.

The leaching operation is carried out in an autoclave under adequate agitation, e.g. 600 rpm, and the time thereof should be sufficient to effect satisfactory overall conversion of the copper values present in the concentrate. The overall conversion should be at least about 90% and preferably over 97%. The term "overall conversion" means the total percent of copper present in the concentrate which is converted to insoluble basic sulphate that remains in the residue and also to soluble copper sulphate which goes into solution. Normally, a period of about 2½ hours has been found sufficient to provide maximum overall conversion.

The copper concentrates that can be treated in accordance with this invention are the usual concentrates which contain mineral sulphides, such as chalcopyrite, bornite and the like or mixtures thereof. The process is however particularly well suited for the hydrometallurgical treatment of chalcopyrite concentrates which are the most common in the industry.

A remarkable feature of this invention is that such concentrate can be treated as received, i.e. without an additional grinding. However, if desired, the concentrates can also be ground for about one-half hour or so prior to being slurried in the autoclave and leached. Care must, however, be taken not to overgrind the concentrates, since % Cu dissolution is much higher with ground concentrates than with non ground ones, and one must keep in mind that according to the present invention dissolution should not be in excess of 50% and preferably not in excess of 40% of the overall converted Cu, as the major proportion of the Cu values should be transformed into an insoluble basic copper sulphate which remains in the residue. Thus, when grinding is effected, one can adjust other conditions of the reaction (e.g. lowering the temperature) to prevent too much dissolution of Cu.

Similar considerations must be made when adjusting the solids content in the slurry. Usually a percent solids between about 20 and 30% by weight will be quite adequate. These are percentages normally used in the art. Lower percentages will also be satisfactory, however, one must not forget to make necessary adjustments in the $H^+/Cu$ and $Cl^-/Cu$ or $Br^-/Cu$ ratios mentioned above as well as in the temperature and oxygen pressure conditions, to avoid excessive dissolution of Cu in the leach solution.

As already mentioned above, as the reaction progresses, the pH of the slurry stabilizes generally between about 2.5 and 4.5. It is presumed that this is due to an equilibrium taking place during the reaction between the formation of soluble copper sulphate and of solid basic sulphate, as indicated below:

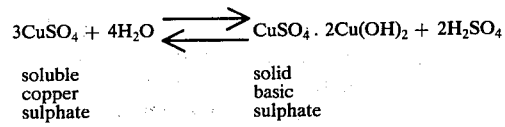

$$3CuSO_4 + 4H_2O \rightleftarrows CuSO_4 \cdot 2Cu(OH)_2 + 2H_2SO_4$$

soluble copper sulphate solid basic sulphate

It should, however, be understood that this is simply a scientific presumption and it does not affect nor limit in any way this invention. The exact pH that will be maintained, may to some extent be controlled by other variables, such as temperature, leach solution composition, nature of the concentrate, percent solids used, and the like. The conditions can easily be verified and controlled by those familiar with the art of hydrometallurgy in general.

When the leaching operation has been completed, the solid residue is separated from the leach solution, e.g. by filtration, and washed to eliminate the remaining traces of chloride or bromide ions. This residue will mainly contain iron, sulphur and basic copper sulphate. The presence of the basic copper sulphate in the residue has been confirmed by X-ray diffraction analysis. As example of the composition, there may be found 20% S°, 35% $Fe_2O_3$, 36% $CuSO_4 \cdot 2 Cu(OH)_2$ and 9% remaining constituents, including any precious metal values. There are several known ways in which copper values may be recovered from such a residue. For example, this may be done by selective dissolution of copper in an ammoniacal ammonium sulphate solution followed by solvent extraction from the ammoniacal liquor, stripping with sulphuric acid, and electrowinning from the sulphuric acid solution; or still by leaching the residue in dilute sulphuric acid followed by a solution purification step and electrowinning from the resulting purified solution. Such methods are generally known in the art and it is unnecessary to describe them here in greater detail since, in themselves, they do not form part of the present invention.

The filtrate obtained from such separation basically contains all the chloride or bromide ion, some dissolved Cu in the form of $CuSO_4$ and remarkably contains no iron. This filtrate can therefore be reused, with proper adjustments, for subsequent leaching operations. Thus, the process according to this invention can either be used batchwise or continuously on a cyclic basis. The continuous operation is particularly advantageous, since it makes it possible to reuse the leaching solution over and over again. In spite of the fact that there is some Cu dissolved in this solution, the concentration of this dissolved Cu remains generally constant when recycling of the solution takes place. Thus, in this way a steady and continuous recovery of Cu values can be achieved according to this invention. It will also be realized that it is much easier to recycle the liquid solution, rather than the solid unreacted concentrates as this is done according to some known hydrometallurgical processes.

The invention will now further be described with reference to the appended drawings in which.

Figure 1:
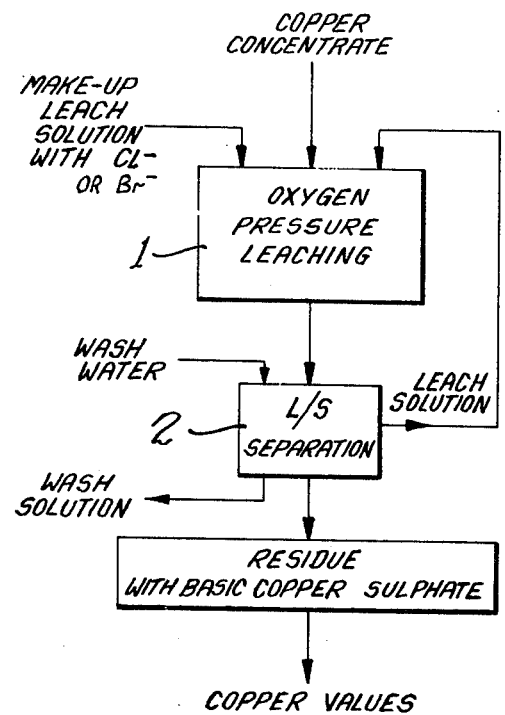
FIG. 1 illustrates a flow sheet of the present process in a preferred embodiment.

The simplicity of the present process is illustrated in FIG. 1. As shown in this figure, a suitable leach solution containing chloride or bromide ions is introduced into a tank or autoclave at 1 where it is reacted with the copper concentrates under elevated temperature and oxygen overpressure. Then, liquid-solid separation is effected at 2 and the solids are washed with wash water to eliminate remaining traces of chloride or bromide ion while the leach solution may be recycled to 1 and reused for the next leaching operation.

The copper values are recovered from the residue in a suitable known manner as already explained above.

Figure 2:
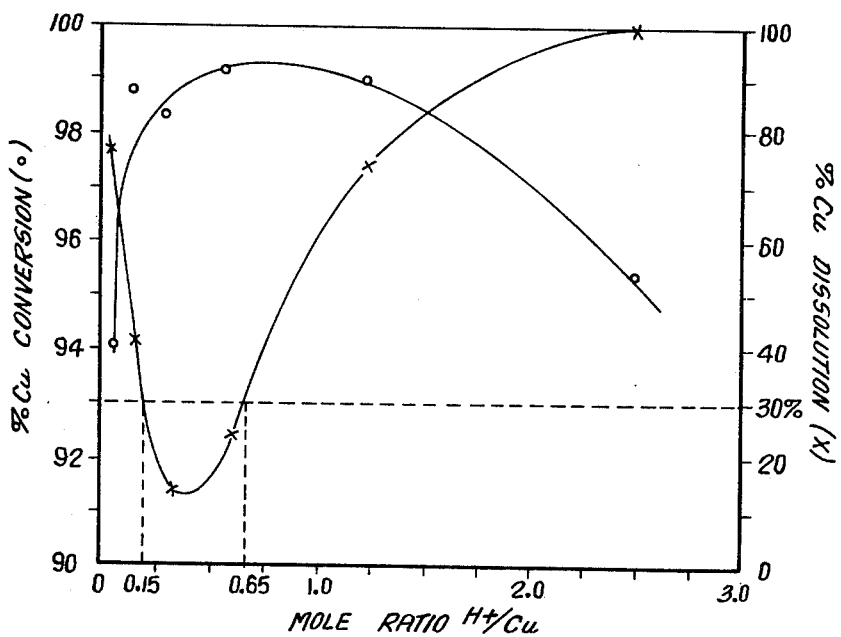
FIG. 2 is a graphical representation exemplifying suitable molar ratios of H+/Cu in an acidic leach solution that can be used in accordance with this invention.

In cases where an acidic leach solution is prepared, FIG. 2 illustrates the effect of acid concentration on copper conversion and distribution. In this particular case, an HCl - $H_2SO_4$ leach solution was used with % HCl by weight therein of 51.5. The operating temperature was 145° C; the oxygen partial pressure was 200 psig; the slurry was 25% solids by weight; and the reaction time was 2½ hours. It is clearly seen from this graph that if one desires a relatively high percent Cu overall conversion and at the same time a dissolution of Cu in the leach solution of only about 30% or less, then the mole ratio H+/Cu should be between 0.15/1 and 0.65/1.

Figure 3:
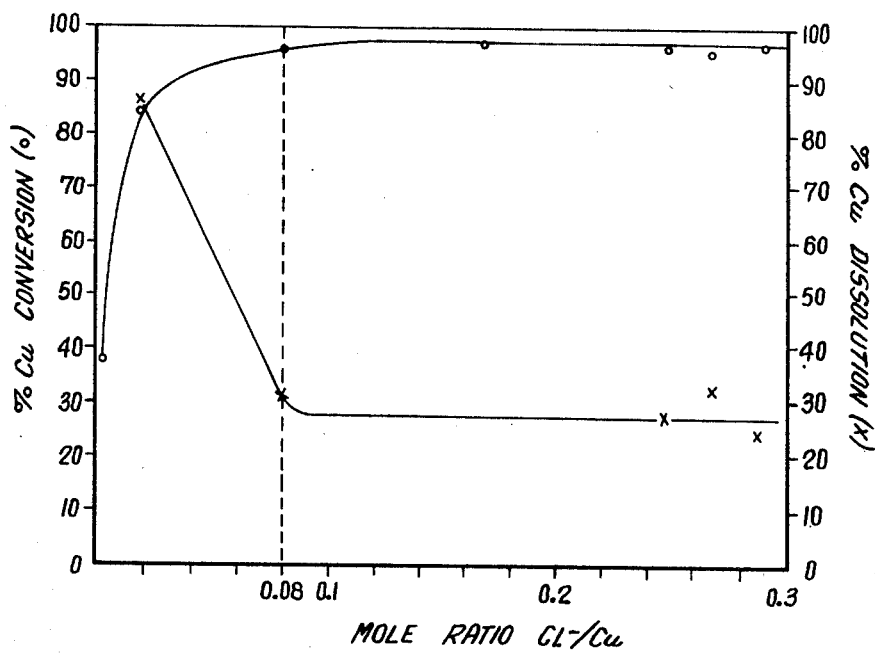
FIG. 3 is a graphical representation exemplifying suitable molar ratios of Cl−/Cu in a leach solution that can be used in accordance with this invention.

In FIG. 3, it is illustrated that to achieve high overall Cu conversion and about 30% Cu dissolution, in the presence of chloride ion, the mole ratio of Cl−/Cu should be greater than 0.08/1. However, at approximately 0.1/1 the conditions stabilize and further increase in Cl−/Cu ratio does not produce improved results, although it is not harmful either. It is however quite suprising to note that with no chloride ion present, the percent overall Cu conversion is less than 40% while with only 0.08 mole Cl− per mole of Cu present, it increases to about 97%. The operating conditions in this case were the same as for FIG. 2, with the H+/Cu mole ratio being 0.29/1.

Figure 4:
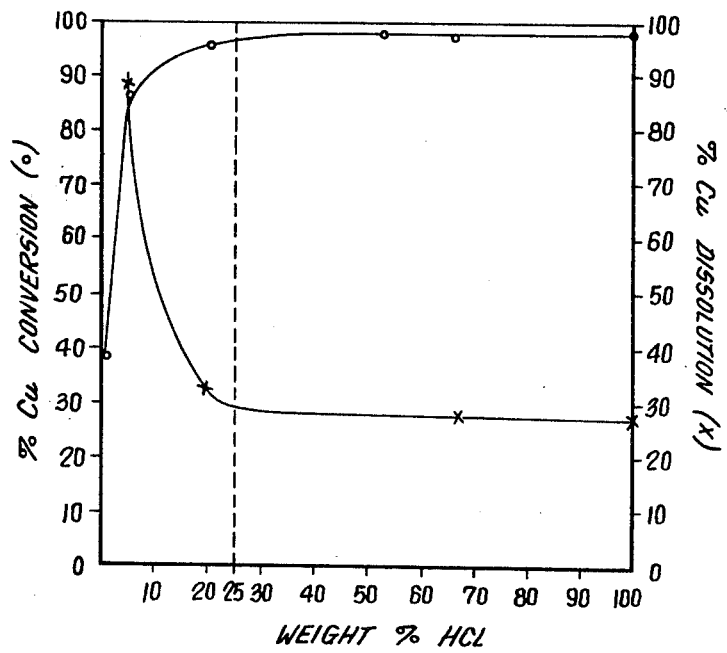
FIG. 4 is a graphical representation exemplifying suitable proportions of HCl in a leach solution of HCl and $H_2SO_4$ that can be used in accordance with this invention.

FIG. 4 illustrates that when an HCl - $H_2SO_4$ combination is used, at least 25% by weight HCl are required to achieve the desired high overall Cu conversion and low Cu dissolution. Again at a certain point, the conditions stabilize and further increase in the proportion of HCl gives no special beneficial result. The operating conditions were the same as for FIG. 3.

The invention will now be further illustrated by the following specific, but non limitative, examples.

EXAMPLES 1 – 20

In order to verify the suitability of various sources of chloride ions and their combinations with one another or with sources of sulphate ions, a series of tests have been performed in an autoclave on a slurry of as-received Gaspe copper concentrate at 25% solids, 145° C, 200 psig $O_2$, 2½ hours reaction time, and 600 rpm agitation. The as-received copper concentrate had a particle size of 72% by weight minus 325 mesh Tyler screen and contained chalcopyrite with minor amount of bornite. The results of these tests are summarized in the following Table I.

TABLE I

| Ex. No. | Leach Solution Composition, gpl | | | | | | % $S^0$ Yield | % Copper Conversion (overall) | % Acid Soluble Cu Distribution | |
|---|---|---|---|---|---|---|---|---|---|---|
| | NaCl | HCl | $CaCl_2$ | $NH_4Cl$ | $H_2SO_4$ | $Na_2SO_4$ | | | Cu in Residue | Cu in Solution |
| 1 | 27.2 | — | — | — | — | — | — | 96.6 | 97.6 | 2.4 |
| 2 | 5.5 | — | — | — | — | — | — | 96.0 | 37.6 | 62.4 |
| 3 | 2.8 | — | — | — | — | — | — | 97.4 | 41.0 | 59.0 |
| 4 | 13.6 | 8.5 | — | — | — | — | — | 98.7 | 62.2 | 37.8 |
| 5 | — | — | 34.3 | — | — | — | 75 | 94.3 | 87.8 | 12.2 |
| 6 | — | — | — | 24.9 | — | — | 67 | 97.4 | 95.0 | 5.0 |
| 7 | — | 17.0 | — | — | — | 23.2 | — | 97.6 | 63.5 | 36.5 |
| 8 | — | 17.0 | — | — | — | 46.4 | — | 97.5 | 79.8 | 21.2 |
| 9 | — | 17.0 | — | — | 16 | — | 82 | 99.3 | 75.0 | 25.0 |
| 10 | — | 14.5 | — | — | — | — | 78.0 | 97.0 | 73.4 | 26.6 |
| 11 | — | 16.1 | — | — | — | — | 66.9 | 99.2 | 68.8 | 31.2 |
| 12 | — | — | — | — | 19.45 | — | 9.8 | 39.20 | 24.3 | 75.7 |
| 13 | — | 10.45 | — | — | 5.45 | — | 79.8 | 96.75 | 71.2 | 28.8 |
| 14 | 27.2 | — | — | — | 16.0 | — | — | 98.7 | 59.2 | 40.8 |
| 15 | — | 34.0 | — | — | 32.0 | — | 85.3 | 99.1 | 25.6 | 74.4 |
| 16 | — | 68.0 | — | — | 64.0 | — | — | 95.4 | 0.0 | 100.0 |
| 17** | — | 27.5 | — | — | 25.8 | — | 73.3 | 98.9 | 57.2 | 42.8 |
| 18 | — | 13.5 | — | — | 1.33 | — | 85.4 | 96.20 | 66.5 | 33.5 |
| 19* | — | 0.5 | — | — | 1.00 | — | 26.1 | 63.9 | 4.2 | 95.8 |
| 20* | — | 0.5 | — | — | 5.0 | — | 38.5 | 69.4 | 7.0 | 93.0 |

*Tests carried out at temp. of 175° C rather than 145° C as in all other cases
**Test carried out with 35% solids rather than 25% solids as in all other cases.

From the above Table, it is clear that various sources of Cl− (chloride ion) can be used either alone or combined with one another or with sources of $SO_4^{--}$, such as sulphuric acid or sodium sulphate. However, when insufficient concentration of chloride ion is used, as in examples 2, 3, 19 and 20, no satisfactory results are achieved since excessive Cu goes into solution. Also, when no chloride ion is used as in example 12, only 39.20% overall conversion is reached. Furthermore, when too much acid is used as in examples 15 and 16, too much Cu is dissolved and the process according to this invention becomes ineffective. Best results are achieved according to examples 9 and 11 where over 99% overall conversion is reached with acceptable Cu distribution in the residue and solution. Other satisfactory results are those of examples 1, 4, 5, 6, 8, 10, 13 and 18. More or less satisfactory results were obtained according to examples 7 and 14.

EXAMPLES 21 – 25 (Cyclic HCl — $H_2SO_4$ Tests)

A five-cycle pressure leach run was performed with as-received Gaspe copper concentrate with a head assay of 24.4% Cu, 30.6% Fe, 32.5% S. The conditions selected were as follows: temperature = 145° C; pressure = 200 psig oxygen; solids = 25%; agitation = 600 rpm; leaching time = 2.5 hrs; and an initial solution composition of 17.0 gpl HCl and 16.0 gpl $H_2SO_4$ (mole ratio H+/Cu = 0.63). The leach solution from each preceding cycle was used in the next leaching cycle; the chloride ion concentration in the leach solution was maintained at the initial level through the addition of hydrochloric acid; no sulphuric acid was added during the cyclic tests. The pH during each pressure leach stabilized at 2.8-3.2. The results are summarized in the following Table II.

TABLE II

| Ex. No. | Leach Residue | | | | Leach Solution | | | % Cu Conversion | % S⁰ Yield |
|---|---|---|---|---|---|---|---|---|---|
| | Wt. % of Feed | Cu % | Fe % | Total S % | Cu gpl | SO₄ gpl | Fe gpl | | |
| 21 | 118 | 24.9 | 26.3 | 26.4 | 18.2 | 12.3 | nil | 98.0 | 78 |
| 22 | 135 | 20.0 | 22.7 | 23.9 | 11.5 | 7.0 | nil | 98.3 | 80 |
| 23 | 128 | 18.6 | 24.0 | 24.1 | 12.8 | 7.9 | nil | 98.9 | 79 |
| 24 | 131 | 19.6 | 23.4 | 23.4 | 10.6 | 7.1 | nil | 97.4 | 77 |
| 25 | 130 | 18.8 | 23.6 | 24.4 | 12.1 | 9.0 | nil | 98.1 | 74 |

The data in this Table indicate that there is no buildup of copper or sulphate in solution during recycling. The copper and sulphur entering the system after the first cycle quantitatively report in the leach residue. The sulphur in the residue is present as basic sulphate and elemental sulphur. The average yield of elemental sulphur is 78%. The average Cu conversion is 98.2%. The results clearly indicate that the leach can be run on a cyclic basis with no apparent ill effect on the degree of copper conversion or copper distribution.

In addition to the above examples, the following effects have been studied.

1. Effect of Temperature

The effect of temperature over the range of 115°–175° C was studied with as-received (mesh size 72% minus 325 Tyler) and also with ground (mesh size 99% minus 325 Tyler) Gaspe copper concentrate at 200 psig oxygen pressure, 25% solids, 600 rpm agitation and 2.5 hour leach time as well as with a leach solution composition of 17.0 gpl HCl + 16.0 gpl $H_2SO_4$. The results indicate that copper conversion with as-received concentrate is essentially independent of temperature in the range of about 145°–175° C, but decreases slightly when leaching at 135° C or below. The percent copper dissolution increases with temperature over the whole range. The best temperature range appears to be between 125° C and 160° C. When ground concentrate was reacted, lower temperatures have also been found adequate.

2. Effect of Pressure

The effect of oxygen partial pressure on leaching has been studied for the same material and under the same conditions as indicated above with reference to the effect of temperature. The results show that the preferred pressure range is between 200 and 300 psig of oxygen, although somewhat lower or higher partial pressures may also be used. For example, pressures as low as 100 psig oxygen have been found successful in some instances.

3. Effect of Time

The effect of time on copper conversion and distribution in pressure leaching of as-received Gaspe copper concentrate (mesh size 72% minus 325 Tyler) was also investigated. The conditions employed were the same as those mentioned above with reference to the temperature and pressure effects. The results indicate that the copper conversion increased rapidly with time up to about 1.5 hours, and was essentially completed at 2.5 hours. The proportion of copper dissolved was in the acceptable range of 30–40%.

4. Effect of Percent Solids

The effect of % solids in the slurry of as-received Gaspe copper concentrate was investigated. It showed that the range of 15–35% is satisfactory provided the mole ratio H+/Cu is properly adjusted when the solid % is in the lower range. Copper conversion was 98% and the degree of copper dissolution was 43%. The preferred range is between about 20 – 30% solids.

5. Effect of Grinding — Examples 26 – 33

A series of experiments was performed with Gaspe copper concentrate ground for one-half hour to determine if the copper conversion could be increased. The results are given in the following Table III.

TABLE III

| Ex. No. | Leach Solution Composition gpl | | | Leach Conditions | | | % S⁰ Yield | Overall % Cu Conv. | % Acid Soluble Cu Distribution | |
|---|---|---|---|---|---|---|---|---|---|---|
| | NaCl | HCl | H₂SO₄ | Time hr | Temp. ° C | O₂ psig | | | Residue | Solution |
| 26 | 27.2 | — | — | 2.5 | 145 | 200 | 64 | 99.9 | 86 | 14 |
| 27 | 27.2 | — | — | 2.5 | 130 | 200 | 62 | 99.6 | 96 | 3 |
| 28 | — | 8.5 | 8.0 | 2.5 | 130 | 200 | 69 | 99.6 | 57 | 43 |
| 29 | 27.2 | — | — | 2.5 | 145 | 100 | 63 | 99.9 | 73 | 27 |
| 30 | — | 8.5 | 8.0 | 2.5 | 130 | 100 | 64 | 99.8 | 51 | 49 |
| 31 | 13.6 | — | — | 2.5 | 130 | 200 | 70 | 99.6 | 90 | 10 |
| 32 | 27.2 | — | — | 1.5 | 130 | 200 | 68 | 98.5 | 99 | 1 |
| 33 | 27.2 | — | — | 2.5 | 115 | 200 | 64 | 96.8 | 96 | 4 |

The data in this Table show that leaching the ground concentrate with 27.2 gpl NaCl for 2.5 hours at 145° C or 130° C under 200 psig oxygen resulted in a copper conversion greater than 99.5% (c.f. Ex. 26, 27). Decreasing the leaching time from 2.5 hours to 1.5 hours at 130° C lowered the copper conversion to 98.5%. Dropping the oxygen pressure from 200 psig to 100 psig, when leaching with 27.2 gpl NaCl at 145° C did not affect the copper conversion. The conversions obtained when leaching with 8.5 gpl HCl + 8.0 gpl $H_2SO_4$ were identical to those obtained with 27.2 gpl NaCl, all other conditions being equal.

The copper distribution of the ground material treated with sodium chloride leach at 200 psig oxygen was similar to that obtained with as-received copper concentrate. Lowering the oxygen pressure to 100 psig increased copper dissolution sharply. The fraction of copper dissolved when leaching with HCl — $H_2SO_4$ solution was higher than with sodium chloride due to the increased acidity of the system.

EXAMPLE 34

To test the effectiveness of bromide ion reactivity under similar conditions, a test has been performed in an autoclave with as received Brenda copper concentrate having a head assay of 28.4% Cu, 26.1% Fe and 30.8% S, using $H_2SO_4$ and KBr combination. The conditions were as follows: the slurry contained 25% solids and the leach solution contained 16 gpl $H_2SO_4$ — 57 gpl KBr; the temperature was 145° C and the pressure 200 psig of $O_2$; the reaction was carried out with an agitation of 630 rpm and oxygen was purged at 3 liters/min.

The results of this test are summarized in the following Table IV.

TABLE IV

| Leaching Time min. | % Copper Conversion | Leach Solution Assay | | |
|---|---|---|---|---|
| | | Cu, gpl | $Fe_{tot}$, gpl | pH |
| 5 | 23.6 | 4.0 | Nil | 3.3 |
| 10 | 53.0 | 2.9 | " | 4.3 |
| 15 | 63.6 | 1.8 | " | 4.7 |
| 30 | 86.7 | 0.8 | " | 5.0 |
| 60 | 96.3 | 2.0 | " | 3.8 |
| 90 | 99.1 | 3.0 | " | 3.3 |
| 150 | 99.2 | 2.9 | " | 3.6 |

It is clear from this table that the bromide ion reacts in the same manner as the chloride ion and that its presence leads to very high overall conversions after only 60 minutes of leaching time, similar to those obtained with the use of the chloride ion.

EXAMPLE 35

The test of Example 34 was repeated but using as initial leach solution the final filtrate from the test of Example 34. This filtrate was brought to approximately 57 gpl KBr before recycle to the autoclave, but no make-up sulphuric acid was added.

The results of this test are summarized in the following Table V.

TABLE V

| Leaching Time min. | % Copper Conversion | Leach Solution Assay | | |
|---|---|---|---|---|
| | | Cu, gpl | $Fe_{tot}$ gpl | pH |
| 5 | 6.9 | 7.1 | 2.7 | 2.2 |
| 10 | 9.1 | 6.8 | 2.8 | 1.8 |
| 15 | 26.3 | 6.1 | Nil | 3.3 |
| 30 | 71.9 | 5.6 | " | 3.9 |
| 60 | 95.1 | 2.3 | " | 5.0 |
| 90 | 98.9 | 4.4 | " . | 3.4 |
| 150 | 99.1 | 4.1 | " | — |

These results demonstrate again that the recycle of the leach solution with proper adjustment of bromide ion concentration leads to satisfactory results similar to those obtained with the chloride ion. The chloride and the bromide ions therefore react essentially in the same manner.

The possibility of using the other two halogen ions in such operation was also examined.

A test was made using a leach solution containing an iodide ion. It failed to achieve the desired results. The pressure leach residue from this test contained a large amount of unreacted concentrate and it filtered very poorly. The apparent failure of this solution was not unexpected, since it is known that cupric sulphate solution reacts with iodide ions to precipitate cuprous iodide and liberate free iodine.

A leach solution based on the use of a fluoride ion would not be practical since such solutions are damaging to human skin, attack glass equipment and would be expected to react with the silicate gangue minerals in the copper concentrate. The fluoride ion was therefore eliminated from consideration as a suitable reactant.

Thus, only chloride and bromide ions or a combination thereof are suitable for the purposes of the present hydrometallurgical treatment of copper concentrates.

Generally speaking, the above non-limitative examples and results clearly indicate the great simplicity, efficiency and advantages of the novel process of this invention, leading to an important advance in the art of hydrometallurgical recovery of copper values from copper concentrates.

We claim:

1. A hydrometallurgical method of recovering copper values from copper sulphide concentrates which comprises:
   a. forming an aqueous leach solution containing chloride or bromide ions therein and a total amount of acid such that the molar ratio of $H^+/Cu$ is between 0 and about 0.65/1;
   b. dispersing copper sulphide concentrates in said leach solution to form a slurry;
   c. adjusting the amount of chloride or bromide ions in the slurry such that the molar ratio of $Cl^-/Cu$ or $Br^-/Cu$ is greater than about 0.08/1;
   d. carrying out the leaching operation at a temperature between about 115° C and about 160° C and under an oxygen pressure above 100 psig, while agitating the slurry;
   e. separating resulting leach residue containing the copper values essentially in the form of basic copper sulphate from the leach solution; and
   f. recovering the copper values from the leach residue.

2. Method according to claim 1, wherein the aqueous leach solution containing chloride ions is formed with hydrochloric acid.

3. Method according to claim 1, wherein the aqueous leach solution containing chloride ions is formed with NaCl, $CaCl_2$ or $NH_4Cl$.

4. Method according to claim 1, wherein the aqueous leach solution containing bromide ions is formed with HBr, NaBr or KBr.

5. Method according to claim 1, wherein the aqueous leach solution containing chloride ions is formed with a mixture of hydrochloric acid and sulphuric acid, the mixture containing at least 25% by weight of hydrochloric acid.

6. Method according to claim 1, wherein the aqueous leach solution also contains a source of sulphate ions.

7. Method according to claim 1, wherein the pH of the slurry is maintained between about 2.5 and 4.5 during the leaching reaction.

8. Method according to claim 1, wherein the leaching operation is carried out under an oxygen partial pressure of between about 200 and 300 psig.

9. Method according to claim 1, wherein the leaching operation is carried out for a period sufficient to effect at least 97% overall conversion of Cu.

10. Method according to claim 1, wherein the copper sulphide concentrates are essentially chalcopyrite concentrates.

11. Method according to claim 1, wherein the copper sulphide concentrates are dispersed in the leach solution in as-received condition, without prior grinding.

12. Method according to claim 1, wherein the copper sulphide concentrates are ground for one half hour prior to being dispersed in the leach solution.

13. Method according to claim 1, wherein upon separation of the leach residue, said residue is washed to eliminate remaining traces of chloride or bromide ions.

14. Method according to claim 1, wherein upon separation of the leach residue, the remaining leach solution is recycled and reused to form an aqueous leach solution suitable for treating fresh copper sulphide concentrates on a continuous, cyclic basis.

15. Method according to claim 1, wherein the copper values are recovered from the residue by selective dissolution of copper in an ammoniacal ammonium sulphate solution followed by solvent extraction from the ammoniacal liquor, stripping with sulphuric acid, and electrowinning from the sulphuric acid solution.

16. Method according to claim 1, wherein the copper values are recovered from the residue by leaching the residue in dilute sulphuric acid to dissolve the basic copper sulphate and electrowinning the copper values from the resulting solution.

17. Method according to claim 1 wherein initially no acid is present in the slurry.

18. A hydrometallurgical method of recovering copper values from copper sulphide concentrates, which comprises:
 a. forming an aqueous acid leach solution containing chloride or bromide ions therein;
 b. adjusting the amount of total acid in the solution such that the molar ratio $H^+/Cu$ is between about 0.15/1 and 0.65/1;
 c. dispersing copper concentrates in said leach solution to form a slurry;
 d. adjusting the amount of chloride or bromide ions in the slurry such that the molar ratio $Cl^-/Cu$ or $Br^-/Cu$ is greater than 0.08/1;
 e. carrying out the leaching operation at a temperature between about 125° C and 160° C and under an oxygen partial pressure above 180 psig, while agitating the slurry;
 f. separating resulting leach residue containing the copper values essentially in the form of basic copper sulphate from the leach solution; and
 g. recovering the copper values from said leach residue.

* * * * *

UNITED STATES PATENT AND TRADEMARK OFFICE
CERTIFICATE OF CORRECTION

PATENT NO. : 4,039,406
DATED : August 2, 1977
INVENTOR(S) : Robert W. Stanley & Kohur Nagaraja Subramanian It is certified that error appears in the above-identified patent and that said Letters Patent are hereby corrected as shown below:

Under Foreign Application Priority Data, the filing date of the Canadian priority application should be --August 30, 1973-- rather than --August 10, 1973--.

Signed and Sealed this

Twenty-seventh Day of December 1977

[SEAL]

Attest:

RUTH C. MASON
*Attesting Officer*

LUTRELLE F. PARKER
*Acting Commissioner of Patents and Trademarks*